May 18, 1943. O. E. FISHBURN 2,319,496
SYNCHRONIZER
Filed Oct. 30, 1941
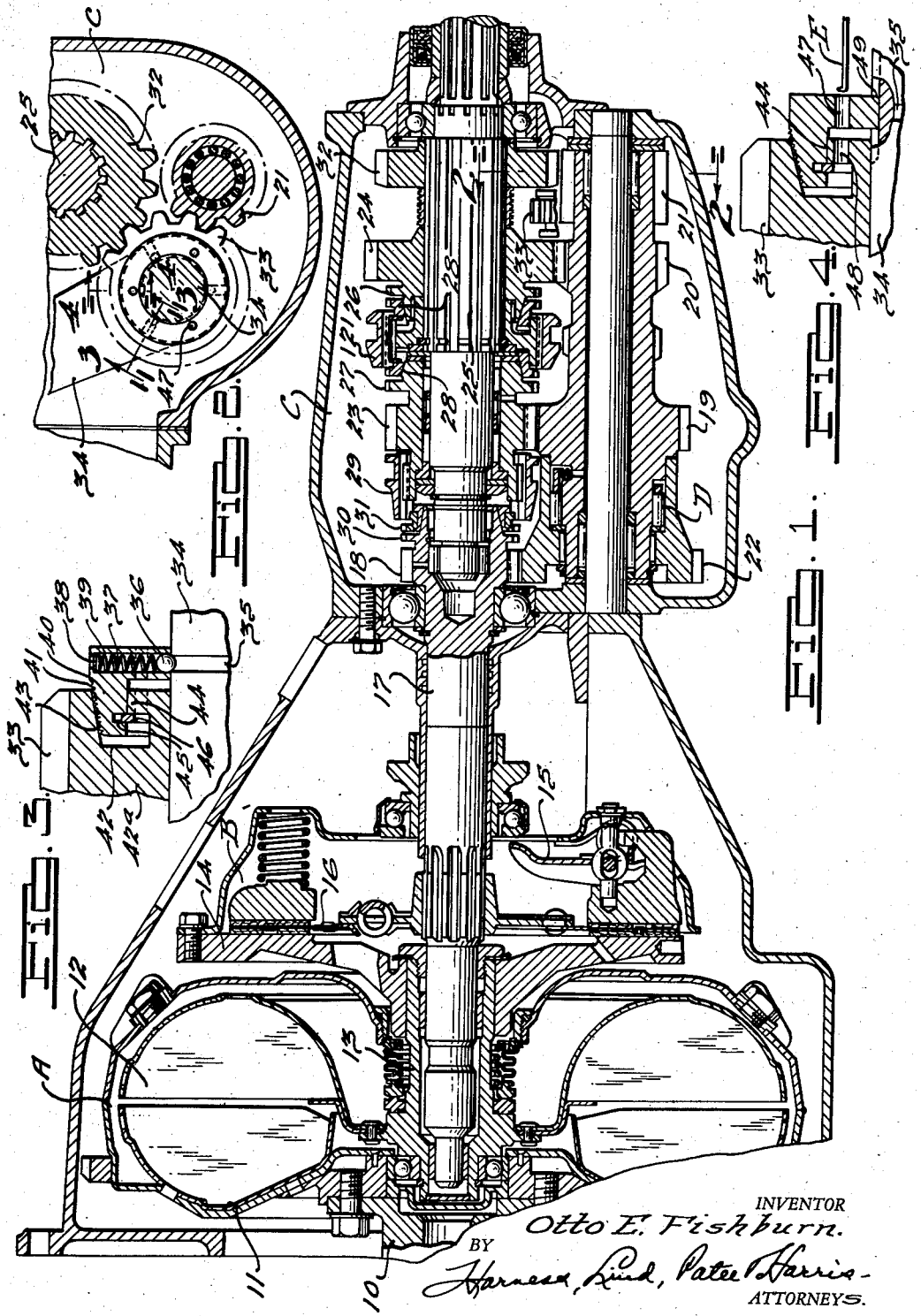
INVENTOR
Otto E. Fishburn.
BY
Harness, Dind, Pater & Harris
ATTORNEYS.

Patented May 18, 1943

2,319,496

UNITED STATES PATENT OFFICE 2,319,496

SYNCHRONIZER

Otto E. Fishburn, Detroit, Mich., assignor to Chrysler Corporation, Highland Park, Mich., a corporation of Delaware Application October 30, 1941, Serial No. 417,090

13 Claims. (Cl. 74—339)

This invention relates to synchronizers and more particularly to improvements in motor vehicle transmissions embodying engageable parts subject to clash-engagement.

One object of my invention is to provide means for synchronizing engageable transmission parts which do not lend themselves to conventional methods of synchronization.

Another object is to synchronize engageable transmission elements by bringing one of the elements to the speed of the other prior to their engagement, especially where such elements are ordinarily engaged at a time when the speed of one is zero and where the other element is subject to rotational drag or spin. With such an arrangement the synchronizer acts as a brake.

A further object is to provide a synchronizer for transmission elements adapted to be engaged when the vehicle is at a standstill. In many transmissions synchromesh mechanism is provided for speed ratio changes other than a drive ratio used to propel the vehicle from standstill. Because of the inertia of the transmission parts, clutch drag or spin, or other factors, clashing of the engageable parts frequently results, my invention being adapted to overcome such objections.

A further object is to provide means for synchronizing engaging gears of a reverse drive gear set.

Further objects and advantages of my invention will be more apparent as this specification progresses, reference being made to the accompanying drawing illustrating one embodiment thereof and in which:

Fig. 1 is a longitudinal sectional elevational view through my transmission.

Fig. 2 is a transverse sectional view taken as indicated by line 2—2 of Fig. 1.

Fig. 3 is a fragmentary sectional view taken as indicated by line 3—3 of Fig. 2.

Fig. 4 is a similar view taken as indicated by line 4—4 of Fig. 2.

In order to illustrate the principles of my invention I have shown the same in connection with the shiftable reverse idler of a transmission which in general is of known commercial type wherein I have made provision for synchronizing the engageable parts for driving the vehicle in a starting ratio—reverse in this instance.

The illustrated transmission comprises an engine drive shaft 10 carrying the vaned impeller 11 of fluid coupling A. The impeller drives the vaned runner 12 by fluid circulation in known manner, this runner driving shaft 13 to which is fixed the driving runner 14 of a conventional friction clutch B having release levers 15. The driven clutch member 16 is splined to the transmission input shaft 17 carrying the main drive pinion 18 in transmission C.

The transmission may be of any desired type, that illustrated being in general the transmission used on 1941 Chrysler "fluid drive" modified to incorporate my invention. This transmission comprises countershaft gearing drivingly connected to shaft 17. This gearing embodies a countershaft cluster having gears 19, 20, 21 driven through overrunning clutch D by a gear 22 in constant mesh with pinion 18, the clutch D allowing the gear 22 to run slower but not faster than gears 19, 20 and 21. Two gears 23, 24 are mounted loose on the transmission output shaft 25 and are respectively in constant mesh with gears 19 and 20. A shiftable clutch sleeve 121, which is in constant drive connection with shaft 25, is adapted to selectively clutch with teeth 26 of gear 24 or with teeth 27 of gear 23 to respectively provide either first or third speed overrunning drives. The first speed drive is from shaft 10 through coupling A and clutch B to shaft 17, thence through pinion 18 and gear 22 through overrunning clutch D to gear 20, thence to gear 24, teeth 26 and sleeve 121 to shaft 25. The third speed drive is the same as first to clutch D whence this drive passes to gear 19 and gear 23, thence through teeth 27 and sleeve 121 to driven shaft 25. Blocker synchronizing rings 28 of commercial type are operably associated with sleeve 121 to insure non-clash shift of the sleeve.

A second clutch sleeve 29 is splined on a forward extension of gear 23 and is adapted to shift forwardly to clutch with teeth 30 of pinion 18 to step-up the drive from first to second or from third to direct fourth. A blocker ring 31 prevents clutching of sleeve 29 with teeth 30 until the speeds of these parts are substantially the same at a time when shaft 17 is coasting down under accommodation of clutch D. Second drive passes from shaft 17 through sleeve 29 to gear 23, thence through gears 19, 20, 24 to teeth 26 and through sleeve 121 to shaft 25. Direct drive is from shaft 17 directly through sleeve 29 to gear 23 thence through teeth 27 and sleeve 121 to shaft 25. Clutch D overruns during the drives in third and fourth.

The primary function of clutch B is to accommodate release of shaft 17 from runner 12 so as to facilitate shift of sleeve 121 between teeth 26 and 27. Shift of sleeve 29 is controlled automatically by means well known and therefore not illustrated in my drawing.

In order to drive the vehicle in reverse, a driven gear 32 is mounted fixed on shaft 25 and adapted to be engaged by rearward shift of a reverse idler gear 33 by its shift yoke 34. The gear 21 is the countershaft drive gear for the reverse gearing set. In the conventional Chrysler transmission referred to, the idler gear 33 is mounted so that when it is shifted rearwardly it is brought into mesh with both the gear 32 and the countershaft drive gear which is of shorter length than my gear 21. In my present arrangement I have provided a longer gear 21 such that the idler gear 33 is in constant mesh with gear 21.

The idler gear 33 is slidably mounted on a shaft 34 which is non-rotatably supported by the transmission housing. This shaft has an annular detent 35 engaged, prior to shift of gear 33 toward gear 32, with a plurality of ball poppets 36 each yieldingly urged inwardly by a spring 37 seated outwardly by a disc 38 which in turn is seated by peening inwardly the upper edge portions of a cylindrical opening 39 in the synchronizer member 40. This member has a conical friction surface 41 which enters a recess 42 formed in the rear face of hub 42ª of gear 33, this recess having a conical friction cup surface 43 lying closely adjacent surface 41. If desired, surface 41 may be formed as a finely threaded surface of approximately 40 threads per inch according to my copending application Serial No. 180,840, filed December 20, 1937.

Gear 33 has its hub 42ª formed with a radial annular shoulder 44 radially within surface 43 and the entrant portion of synchronizer 40 is undercut with a groove 45 to receive a split snapping ring 46 of the contracting type. The ring 46 is expanded in assembling synchronizer 40 on shoulder 44. Then the synchronizer is pushed rearwardly until ring 46 contracts to lie behind shoulder 44 and thus hold synchronizer 40 and gear 33 together as in Fig. 3 with surface 43 slightly spaced from surface 41. In order to disassemble these parts in service, the synchronizer 40 is provided with a plurality of registered pairs of axially extending apertures 47, 48 (Fig. 4) through which a suitable tool E is inserted to expand ring 46 sufficiently to permit the synchronizer to leave gear 33.

Synchronizer 40, at one or more points between balls 36, has splined connection at 49 with shaft 34 such that the synchronizer may slide rearwardly on the shaft but is prevented from turning on the shaft.

When it is desired to drive the vehicle in reverse, the vehicle is of course brought to a standstill and sleeves 29 and 121 in their Fig. 1 neutral positions. Then clutch B is disengaged and gear 33 shifted rearwardly to mesh with gear 32 and then clutch B is engaged to effect the reverse drive which is the same as first to clutch D whence the drive passes through gears 21, 33 and 32 to shaft 25.

When clutch B is released preparatory to shifting gear 33 into reverse, the inertia of the parts including shaft 17, the countershaft cluster, and parts connected thereto tends to keep gear 21 and idler 33 rotating so that gear 33 clashes, but for my invention, with gear 32. This is not only objectionable in delaying the shift but is noisy and destructive of the gear teeth. The tendency toward rotation of gears 21 and 33 is further often aggravated by drag engagement through the disengaged clutch B whereby shaft 18 drives shaft 17 even with clutch B disengaged.

By reason of my invention the aforesaid difficulties are overcome and gear 33 is synchronized with gear 32 as an incident to shifting gear 32 rearwardly for reverse. At this time the gear 32 is not rotating because driven shaft 25 is stationary, the vehicle being at rest. My synchronizer applies a braking force to gear 33 before it engages gear 32 thereby braking the countershaft cluster and drive shaft 17 as follows.

The initial rearward shift of gear 33 brings friction surface 43 against surface 41 of the synchronizer 40 which is yieldingly held against rearward movement on shaft 34 by the balls 36. Inasmuch as synchronizer 40 cannot rotate, a braking force is applied to gear 33 of an amount predetermined by the action of balls 36 in detent 35. Further rearward movement of gear 33, after effecting the stopping of rotation of gear 33 and parts connected thereto, causes balls 36 to spring inwardly and gear 33 then engages gear 32 without clash, the synchronizer 40 moving rearwardly on shaft 34 along with gear 33. The complete rearward shift of gear 33 is practically continuous and operates to rapidly brake gear 21 during the rearward shift of gear 33 prior to its engagement with gear 32.

When returning gear 33 to its Fig. 1 neutral position, shoulder 44 acting on ring 46 restores the synchronizer 40 to its Fig. 3 position.

As a feature of my invention, when used with a fluid coupling A, it is not necessary to manually release the clutch B in shifting to reverse provided that the synchronizing mechanism is made sufficiently rugged especially with reference to the detent pressure in relation to the location from center and areas of the engageable synchronizing friction surfaces so as to sufficiently retard the rotation of all parts between runner 12 and the reverse idler gear 33 to prevent gear clash when the latter is shifted for the reverse drive.

I claim:

1. In a transmission having axially aligned driving and driven shafts; driving and driven gears, said driving gear being shiftable into and out of engagement with said driven gear, said driven gear being mounted on and having a constant drive connection with the driven shaft; countershaft gearing, including a countershaft reverse gear, drivingly connected with the driving shaft; shift means operable to shift said driving gear toward and from engagement with said driven gear thereby to provide a reverse drive from said driving shaft to said driven shaft through said countershaft reverse gear and said driving and driven gears; and means operable in response to gear-engaging operation of said shift means, in shifting the transmission from neutral to reverse, for braking rotation of said countershaft reverse gear prior to engagement of said driving and driven gears.

2. In a transmission having axially aligned driving and driven shafts; driving and driven gears, said driving gear being shiftable into and out of engagement with said driven gear, said driven gear being mounted on and having a constant drive connection with the driven shaft; countershaft gearing, including a countershaft reverse gear, drivingly connected with the driving shaft; shift means operable to shift said driving gear toward and from engagement with said driven gear thereby to provide a reverse drive from said driving shaft to said driven shaft through said countershaft reverse gear and said driving and driven gears; synchronizing braking means operable, in shifting the transmission from neutral to reverse, to brake rotation of said countershaft reverse gear prior to engagement of said driving and driven gears as an incident to operation of said shift means to effect engagement of said driving and driven gears.

3. In a transmission according to claim 1; said driving gear having constant mesh with said countershaft reverse gear.

4. In a transmission having axially aligned driving and driven shafts; a driven gear mounted on said driven shaft; countershaft gearing drivingly connected to said driving shaft and comprising a countershaft reverse gear; a reverse idler gear having constant mesh with said countershaft reverse gear and adapted to be shifted into and out of engagement with said driven gear; shift means for shifting said reverse idler gear; and means operable in response to gear-engaging operation of said shift means, when the transmission is manipulated between neutral and reverse, for braking rotation of said countershaft reverse gear prior to engagement of said reverse idler gear with said driven gear.

5. In a transmission having axially aligned driving and driven shafts; a driven gear mounted on said driven shaft; countershaft gearing drivingly connected to said driving shaft and comprising a countershaft reverse gear; a reverse idler gear having constant mesh with said countershaft reverse gear and adapted to be shifted into and out of engagement with said driven gear; shift means for shifting said reverse idler gear; a first friction surface having a constant drive connection with said reverse idler gear; a second friction surface stationarily mounted; and means operable as an incident to gear-engaging operation of said shift means, when the transmission is manipulated between neutral and reverse, to effect relative engagement of said surfaces prior to engagement of said reverse idler gear with said driven gear.

6. In a transmission having axially aligned driving and driven shafts; a driven gear mounted on said driven shaft; countershaft gearing drivingly connected to said driving shaft and comprising a countershaft reverse gear; a reverse idler gear having constant mesh with said countershaft reverse gear and adapted to be shifted into and out of engagement with said driven gear; shift means for shifting said reverse idler gear; a stationarily mounted idler shaft supporting said reverse idler gear for shifting movement therealong; a friction surface non-rotatably connected to said idler shaft and disposed in the path of gear-engaging shift of said reverse idler gear for braking rotation of said reverse idler gear prior to engagement thereof with said driven gear.

7. In a transmission having axially aligned driving and driven shafts; a driven gear mounted on said driven shaft; countershaft gearing drivingly connected to said driving shaft and comprising a countershaft reverse gear; a reverse idler gear having constant mesh with said countershaft reverse gear and adapted to be shifted into and out of engagement with said driven gear; shift means for shifting said reverse idler gear; a stationarily mounted idler shaft supporting said reverse idler gear for shifting movement therealong; a friction braking surface; means providing an axially yielding connection between said surface and said idler shaft, said surface being disposed in the path of gear-engaging shift of said reverse idler gear.

8. In a transmission having axially aligned driving and driven shafts; a driven gear mounted on said driven shaft; countershaft gearing drivingly connected to said driving shaft and comprising a countershaft reverse gear; a reverse idler gear having constant mesh with said countershaft reverse gear and adapted to be shifted into and out of engagement with said driven gear; shift means for shifting said reverse idler gear; a stationarily mounted idler shaft supporting said reverse idler gear for shifting movement therealong; a friction braking surface disposed in the path of gear-engaging shift of said reverse idler gear; and poppet means providing a yielding connection between said braking surface and said idler shaft.

9. In a transmission having axially aligned driving and driven shafts; a driven gear mounted on said driven shaft; countershaft gearing drivingly connected to said driving shaft and comprising a countershaft reverse gear; a reverse idler gear having constant mesh with said countershaft reverse gear and adapted to be shifted into and out of engagement with said driven gear; shift means for shifting said reverse idler gear; a stationarily mounted idler shaft supporting said reverse idler gear for shifting movement therealong; said reverse idler gear having a recess in a side face thereof formed with a conical bounding surface; a synchronizer splined to said idler shaft for displacement therealong, said synchronizer having a conical surface engageable with said gear conical surface in response to gear-engaging shift of said reverse idler gear; and means providing an axially yielding connection between said synchronizer and said idler shaft.

10. In a transmission according to claim 9; said reverse idler gear having a shoulder; said synchronizer having a slot adjacent said shoulder; and a snap ring carried in said slot and engaging said shoulder whereby to releasably connect said synchronizer with said reverse idler gear.

11. In a transmission according to claim 9; said reverse idler gear having a shoulder; said synchronizer having a slot adjacent said shoulder; and a snap ring carried in said slot and engaging said shoulder whereby to releasably connect said synchronizer with said reverse idler gear; said synchronizer and shoulder having alignable openings therethrough directed generally toward said snap ring for accommodating a tool to disengage said snap ring from said shoulder and thereby facilitate removal of said synchronizer from said reverse idler gear.

12. In a transmission having axially aligned driving and driven shafts; driving and driven gears, said driving gear being shiftable into and out of engagement with said driven gear, said driven gear being mounted on and having a constant drive connection with the driven shaft; countershaft gearing, including a countershaft reverse gear, drivingly connected with the driving shaft; shift means operable to shift said driving gear toward and from engagement with said driven gear thereby to provide a reverse drive from said driving shaft to said driven shaft through said countershaft reverse gear and said driving and driven gears; and means operable in response to gear-engaging operation of said shift means for braking rotation of said countershaft reverse gear prior to engagement of said driving and driven gears; said driving gear having constant mesh with said countershaft reverse gear; said braking means comprising a first friction surface rotating with said driving gear, and a stationarily mounted second friction surface adapted for engagement with said first surface.

13. In a transmission having axially aligned driving and driven shafts, a countershaft-driven gear set adapted to receive drive from said driving shaft for driving said driven shaft reversely with respect to said driving shaft, said gear set including, as a component gear element, a drive-control gear shiftable from a first position of disconnection of the drive relationship of said gear set to a second position of establishing the drive relationship of said gear set, braking means comprising relatively displaceable and relatively engageable friction surfaces one having drive connection with said drive-control gear and the other being stationarily mounted rotatably, said friction surfaces being so constructed and arranged that displacement of one of said surfaces relative to and toward the other is effected in response to shift of said drive-control gear from its said first position to its said second position thereby to relatively engage said surfaces.

OTTO E. FISHBURN.